2,883,435
PURIFICATION OF 1,2-DICHLORO-4-NITROBENZENE

Eldred Welch, North Plainfield, N.J., assignor to General Aniline & Film Corporation, New York, N.Y., a corporation of Delaware No Drawing. Application October 10, 1956
Serial No. 615,002

6 Claims. (Cl. 260—646)

The invention here presented is a process for the production of purified dichloronitrobenzene by the steps of sulphonating and dissolving out the impurities.

1,2-dichloro-4-nitrobenzene is a standard article of commerce of which the United States Tariff Commission reports indicate the sale of approximately 375,000 pounds per year over the last several years.

The material is made commercially by the chlorination of benzene by gaseous chlorine in the presence of a catalyst such as ferrous chloride or antimony trichloride. The resulting dichlorobenzene contains the 1,4-dichlorobenzene and the 1,2-dichlorobenzene. The mixture is then cooled until crystallization occurs and the crystals are centrifuged to remove the greater part of the 1,4-dichlorobenzene which crystallizes at a higher temperature than the 1,2-dichlorobenzene. However the crystallization yields a eutectic mixture of the two isomers from which the 1,2-dichlorobenzene is then isolated by a fractional distillation. The desired 1,2-dichloro-4-nitro-benzene is then prepared by a nitration procedure in which approximately 1470 parts by weight of the 1,2-dichlorobenzene or o-dichlorobenzene is heated to approximately 58° C., stirred vigorously and then to it is added, over a period of about 3 hours, 2070 parts by weight of a mixed acid consisting of 31% of nitric acid, 62% of sulfuric acid and 7% of water. The mixture is cooled by water circulation to keep the temperature from rising above about 58 to 60° C. The temperature of the mixture is then raised to 70° C. over about one-half hour and the material stirred vigorously during that time. The heating and stirring are then continued for another 2 hours until all of the dichlorobenzene has reacted with the acid mixture. There are then added 230 parts by weight of water at a temperature of 40 to 45° C. After another short period of vigorous stirring, the material is allowed to separate and the oil is removed. The removed oil containing the desired 1,2-dichloro-4-nitrobenzene is then washed with water at 40 to 45° C. until acid-free and then dried by vacuum heating. The yield as a rule is approximately 1851 parts by weight, about 96.4% of theory.

In the mononitration of O-dichlorobenzene only 2 isomers are possible, these being 1,2-dichloro-3-nitrobenzene (I) and 1,2-dichloro-4-nitrobenzene (II). Commercial reports indicate that form No. (I) is present in the proportion of about 12%, and the desired product, (II), is present in the proportion of about 88%; as follows:

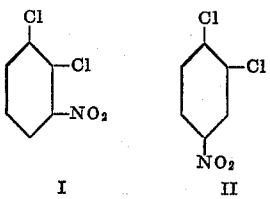

I    II

The great preponderance of isomer II over I is probably due to a large extent to the stearic effect of the chlorine substituents, thus partially blocking the ortho positions and causing the positions para to the chlorine atoms to be more susceptible to attack.

The separation of these 2 isomers is very difficult. The boiling points of the desired 4-nitro compound and the isomer are so close together as to make it practically impossible to purify by distillation. Crystallization from spirit is unsatisfactory and prohibitively expensive, and accordingly many intermediates which might be made from 1,2-dichloro-4-nitrobenzene are made by other, less satisfactory and more expensive processes.

The present invention is based upon the discovery that the 1,2-dichloro-4-nitro-benzene is much more difficult to sulfonate than is the other isomer, the 1,2-dichloro-3-nitro-benzene, and accordingly by careful control of the reaction it is possible to partially sulfonate a mixture of the two in such a manner that the 3-isomer is sulfonated, and thus made water-soluble, while the 4-isomer remains, in the main, unchanged. The 4-isomer which separates on diluting the sulfonation mass, is substantially water-soluble, and accordingly the separation becomes merely a matter of washing out the sulfonated 3-isomer. The resultant material is of the highest purity and is ready for shipment, use or sale merely after a minor drying treatment. In addition, the residual sulfonate, recoverable from the water solution, is also of considerable value for various reactions to produce intermediates, dyestuffs, pharmaceuticals and the like.

Thus the process of the invention sulfonates the impurities in dichloronitrobenzene, thereby rendering them soluble, and then washes them out of the unsulfonated dichloronitrobenzene, leaving behind the pure 1,2-dichloro-4-nitrobenzene and putting the sulfonated impurities into condition for further treatment, purification and the like.

Accordingly the invention is found in the treatment of crude dichloronitrobenzene containing an undesired isomer by dropping the liquid mixture into sulfuric acid containing from 1% to 30% of sulfur trioxide at approximately room temperature in which the crude material is soluble. The mixture is then heated to a temperature in the neighborhood of 130° C. for a substantial number of hours to complete the sulfonation of the undesired isomer. At the end of this time the material is cooled and washed with water to remove the sulfonated, undesired, isomer which is water-soluble. The oily residue is then dried and packaged for use, whereafter the water-soluble sulfonated isomer may be discarded or may be separated by evaporation of the solvent water for such other uses as may be desired.

Other objects and details of the invention will be apparent from the following examples.

Example 1

500 parts of crude 1,2-dichloro-4-nitrobenzene made by the nitration of commercial o-dichlorobenzene are dropped into 1650 parts of fuming sulfuric acid containing 7% free $SO_3$. The solution is heated to 130° C. and held for 6 hours. It is then diluted with water, the oil separated and washed with warm water to remove acid and sulfonation products and dried. There is obtained 380 parts (76% of charge) of 1,2-dichloro-4-nitrobenzene having a freezing point of 40.1–40.6° C.

Example 2

500 parts of crude 1,2-dichloro-4-nitrobenzene are dropped into 2200 parts of fuming sulfuric acid containing 10% free $SO_3$. The solution is heated to 90° C. and held for 24 hours. After diluting, separating, washing and drying there is obtained 369 parts (73.8% of charge) of 1,2-dichloro-4-nitrobenzene having a freezing point of 40.1° C.

*Example 3*

500 parts of crude 1,2-dichloro-4-nitrobenzene are dropped into 1650 parts of fuming sulfuric acid containing 13% free $SO_3$. The solution is heated to 90° C. and held for 24 hours. After diluting, separating, washing and drying there is obtained 373 parts (74.6% of charge) of 1,2-dichloro-4-nitrobenzene having a freezing point of 40.0° C.

I do not limit the operating conditions to the above examples. Free $SO_3$ concentrations of 1 to as high as 30% may be used. Temperatures may vary considerably, from about 40° C. to 140° C. or higher. The ratio of fuming sulfuric acid to organic compound may vary over a wide range, but there must be sufficient free $SO_3$ present to sulfonate the impurities. The time of reaction is dependent on the other factors. In practice, I prefer to use a free $SO_3$ concentration of between 5 and 15% and a temperature of 90 to 130° C.

Thus the process of the present invention prepares a water-insoluble nitro compound and purifies it by sulfonating the impurities and by-products therein and dissolving them out from the desired component to leave a well purified substance behind.

While there are above disclosed but a limited number of embodiment of the process of the invention it is possible to provide still other embodiments without departing from the inventive concept herein disclosed, and it is therefore desired that only such limitations be imposed upon the appended claims as are stated therein or required by the prior art.

The invention claimed is:

1. A process for the purification of 1,2-dichloro-4-nitrobenzene comprising the steps in combination of mixing together the crude dichloronitrobenzene substance with sulfur trioxide preferentially to sulfonate the undesired isomer and thereafter washing out the impurities.

2. The method of producing a high purity 1,2-dichloro-4-nitrobenzene comprising the steps of mixing the crude dichloronitrobenzene with sulfuric acid containing sulfur trioxide to sulfonate the undesired isomer and thereafter washing out the sulfonated isomer.

3. The method of producing a high purity 1,2-dichloro-4-nitrobenzene comprising the steps of mixing the crude dichloronitrobenzene with sulfuric acid containing from 7% to 30% of sulfur trioxide.

4. The method of producing a high purity 1,2-dichloro-4-nitrobenzene comprising the steps of mixing the crude dichloronitrobenzene with sulfuric acid containing sulfur trioxide at a temperature of about 90–130° C.

5. The method of producing a high purity 1,2-dichloro-4-nitrobenzene comprising the steps of mixing the crude dichloronitrobenzene with sulfuric acid containing sulfur trioxide at a temperature of about 90–130° C., thereafter diluting with water.

6. The method of producing a high purity 1,2-dichloro-4-nitrobenzene comprising the steps of mixing the crude dichloronitrobenzene with sulfuric acid containing sulfur trioxide at a temperature of about 90–130° C., thereafter diluting with water and washing the oily layer at a temperature above the melting point of pure 1,2-dichloro-4-nitrobenzene.

References Cited in the file of this patent

Kiprianov et al.: Chem. Abstracts, vol. 25 (1931), p. 5033.

Wertheim: Textbook of Organic Chemistry, 3rd ed., McGraw-Hill Book Co., Inc., New York (1951), p. 488.

UNITED STATES PATENT OFFICE

CERTIFICATE OF CORRECTION

Patent No. 2,883,435                                        April 21, 1959

Eldred Welch

It is hereby certified that error appears in the printed specification of the above numbered patent requiring correction and that the said Letters Patent should read as corrected below.

Column 2, line 22, for "water-soluble" read -- water-insoluble --;

column 3, line 28, for "embodiment" read -- embodiments --.

Signed and sealed this 23rd day of February 1960.

(SEAL)
Attest:

KARL H. AXLINE
Attesting Officer

ROBERT C. WATSON
Commissioner of Patents